United States Patent [19]

van Zanten

[11] Patent Number: 4,492,108
[45] Date of Patent: Jan. 8, 1985

[54] METHOD AND APPARATUS FOR RECOGNIZING IRREGULAR COMBUSTION PROCESSES IN AN INTERNAL COMBUSTION ENGINE

[75] Inventor: Anton van Zanten, Ditzingen, Fed. Rep. of Germany

[73] Assignee: Robert Bosch GmbH, Stuttgart, Fed. Rep. of Germany

[21] Appl. No.: 432,913

[22] PCT Filed: Feb. 24, 1982

[86] PCT No.: PCT/DE82/00034
§ 371 Date: Sep. 29, 1982
§ 102(e) Date: Sep. 29, 1982

[87] PCT Pub. No.: WO82/03685
PCT Pub. Date: Oct. 28, 1982

[30] Foreign Application Priority Data

Apr. 15, 1981 [DE] Fed. Rep. of Germany ....... 3115194
May 27, 1981 [DE] Fed. Rep. of Germany ....... 3121120

[51] Int. Cl.³ .............................................. G01L 23/22
[52] U.S. Cl. .......................................... 73/35; 73/116
[58] Field of Search .................... 73/35, 116; 123/425

[56] References Cited

U.S. PATENT DOCUMENTS

| | | | |
|---|---|---|---|
| 4,153,020 | 5/1979 | King et al. ........................... | 73/35 X |
| 4,271,469 | 6/1981 | Kawai et al. ........................ | 364/431 |
| 4,320,729 | 5/1982 | Sawada et al. .................... | 73/35 X |
| 4,331,117 | 5/1982 | Ginsburgh ......................... | 73/35 X |
| 4,355,534 | 10/1982 | Roger ................................. | 73/35 |

FOREIGN PATENT DOCUMENTS 2918420 11/1980 Fed. Rep. of Germany .
3010324 10/1981 Fed. Rep. of Germany .
2053351 6/1979 United Kingdom .

Primary Examiner—Gerald Goldberg
Assistant Examiner—Ellwood G. Harding, Jr.
Attorney, Agent, or Firm—Frishauf, Holtz, Goodman & Woodward

[57] ABSTRACT

A method is disclosed for the recognition of irregular combustion processes in an internal combustion engine. In this method, a parameter characterizing the course of combustion—for example, pressure, light in the combustion chamber, sound and the like—is detected by means of a sensor, and the sensor signal is integrated within a predetermined crankshaft angle range or time interval of the combustion cycle and compared with a signal integral obtained in a previous cycle. The signal integrals of cycles directly following one another are compared, and monitoring is performed as to whether a signal increase above a predetermined threshold is occurring, in the case where combustion has heretofore been regular, or the signal is decreasing by more than a predetermined amount, in the case where irregular combustion has been taking place. In the first case, the result is the recognition of irregular combustion; in the second case, the result is the recognition of the end of the irregular combustion.

12 Claims, 3 Drawing Figures

METHOD AND APPARATUS FOR RECOGNIZING IRREGULAR COMBUSTION PROCESSES IN AN INTERNAL COMBUSTION ENGINE

STATE OF THE ART

The invention is based on a sensor apparatus of the species of the patent claim.

Combustion engines having internal combustion are only apparently continuous-operation engines. Although torque and rpm are quasi-continuous output variables, still they are generated by a rapid sequence of individual processes.

In the course of optimizing the operation of internal combustion engines and in particular with a view to reducing fuel consumption, it is therefore necessary to detect these interrelationships individually, in order to be able to influence the overall process in a desired manner by exerting influence on the individual processes.

The precondition for doing so is the detection of the status of the interior of the internal combustion engine. Typical status variables here are pressure and temperature, which in the case of the ideal gas indicate the overall status. Although the operation of engines with internal combustion is also determined to a great extent by chemical processes and changes in substances, so that such operation cannot be entirely encompassed by describing the pressure and temperature, still the observation of pressure and temperature provides sufficient information as to the changes in the status variables over the course of the engine cycle.

In this respect, it is known to perform the following operations in the combustion chamber of an internal combustion engine: the detection of the propagation of the combustion process over time and in spatial terms; the detection of the instant of ignition; the detection of injection processes; and the measurement of irregular combustions.

Among these irregular combustions is the phenomenon known as "knocking", which occurs in internal combustion engines under certain conditions. This term is understood to mean oscillations of audio frequency in the compressed fuel-air mixture, which are caused by a shock wave. During these oscillations, the transmission of heat to the piston and cylinder walls of the engine is increased greatly. The result is a harmful thermal overload of these surfaces, so that knocking must in principle be avoided. On the other hand, an effort is also made to exploit the available operating range of the engine to the fullest possible extent, so that means must be provided for indicating knocking early and reliably; in this manner, it is possible to realize a means of engine regulation in which the engine is always operated just below the knocking limit.

Besides the problem of furnishing sensors suitable for detecting knocking, the problem also exists in measurement technology of reading out the knocking signal, reliably and without interference, from the oscillations of the engine detected by the sensor, so that it is possible to regulate the engine appropriately in accordance with a knocking recognition signal of "knocking—YES" or "knocking—NO".

A method and an apparatus for ascertaining knocking in internal combustion engines is known from German Disclosure Document DE-OS No. 29 16 591. In the method described therein, the signal generated by a knocking sensor is integrated within a so-called measuring window, that is, within a predetermined crankshaft angle range or a predetermined time interval, and the signal integral thus obtained is compared with an average value of a multiplicity of signal integrals from preceding combustion cycles.

The known method has the disadvantage, however, that the reference value must be formed from a multiplicity of signal integrals, which requires a certain amount of time for measurement; the known method thus generally suffers from a certain inertia. On the other hand, however, it can also happen that in forming the average value of a multiplicity of signal integrals, signal integrals may be detected from both knocking combustions and non-knocking combustions together, so that an unequivocal signal for either knocking combustion or non-knocking combustion is no longer available as the reference signal, and only a mixed signal is available instead.

ADVANTAGES OF THE INVENTION

The method according to the invention having means for emitting a knocking recognition signal whenever an intelligence signal associated with the knocking process exceeds a background noise reference signal in a prespecified manner has the advantage over the prior art that by comparing sequential combustion processes, a rapid indication of an irregular combustion is possible, so that regulation based on it exhibits a favorable dynamic behavior. In the method according to the invention, a distinction is furthermore made, in comparing the measured and the reference values, between the states of "regular combustion" and "irregular combustion". In terms of the reference value, it is thus clear whether what is to be detected is that an irregular combustion is occurring during a status of regular combustion or, during irregular combustion, whether this irregular combustion has ended.

DRAWING

The method and apparatus according to the invention are illustrated with the aid of drawings and described in greater detail below. Shown are:

FIG. 1, an apparatus for performing the method according to the invention;

FIG. 2, a diagram for explaining the method according to the invention; and

FIG. 3, a further apparatus according to the invention for performing the method according to the invention.

DESCRIPTION OF THE PREFERRED EMBODIMENT

Figure 1:
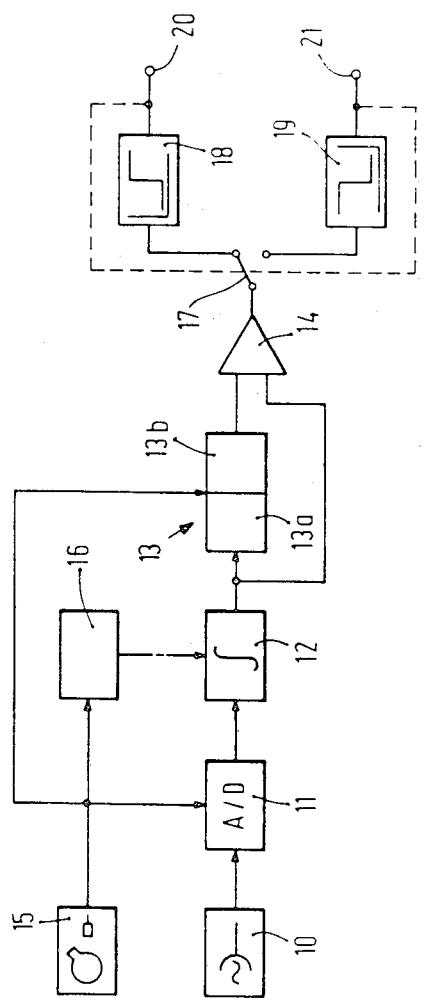

In FIG. 1, 10 identifies a sensor such as is used for detecting parameters which characterize the course of combustion of an internal combustion engine. A sensor of this kind may, by way of example, be a piezoelectric sensor, which reacts to the oscillations of the engine, or to acceleration signals; however, the course of combustion in the engine can also be detected in a manner known per se via the measurement of the combustion chamber temperature, the combustion chamber pressure, or the combustion chamber light. The output signal of the sensor 10 is delivered to an analog-to-digital converter 11, which is connected to an integrator 12, which in turn is connected with one input of a shift register 13. The shift register 13 is shown merely schematically in FIG. 1 and has two memory addresses 13a and 13b; the output of the memory address 13b is connected to one input of a comparator 14, the other input of which is connected with the output of the integrator 12. In the apparatus shown in FIG. 1, a reference marker generator 15 is also provided, which may by way of example be embodied as a toothed wheel transducer or the like on the crankshaft of the engine. The reference marker generator 15 is connected to control inputs of the analog-to-digital converter 11, the shift register 13 and a time control means 16, the last being connected in turn with the control input of the integrator 12. The output of the comparator 14 is carried to a transfer switch 17, by way of which the output signal of the comparator 14 can be switched to either a threshold stage 18 or a threshold stage 19, which have respective output terminals 20 and 21. The output signal of the threshold stages 18, 19, finally, serves to switch over the transfer switch 17.

The mode of operation of the apparatus shown in FIG. 1 is as follows: The signal arriving from the sensor 10 is first converted, in the rhythm of the combustion chamber cycle, in the analog-to-digital converter 11 and then integrated in the integrator 12. The integration time of the integrator 12 is determined by the time control means 16, which in turn is controlled by the reference marker generator 15. In this manner, it is possible to cause the integrator 12 to become effective either within a predetermined crankshaft angle range or within a predetermined time window, beginning at a specific crankshaft angle, thus resulting in a measurement phase which is conventionally known as a measuring window. The sensor signal integrated within the measuring window is subsequently read into the first memory address 13a of the shift register 13. If the next reference marker of the reference marker generator 15 then appears, then this value is shifted on from the memory address 13a to the memory address 13b and a new signal integral is read into the memory address 13a. Thus two signal integrals from sequential cycles of the engine are present at the inputs of the comparator 14. In the case of regular combustion, the transfer switch 17 is in the position shown in FIG. 1. The output signal of the comparator 14 thus proceeds to the threshold stage 18. In this threshold stage 18, it is determined whether the later-measured signal integral has increased by a predetermined amount over the preceding value, or not. If the increase in the signal integral remains below the threshold specified in the threshold stage 18, then regular combustion continues to be recognized, and no signal appears at the output terminal 20. However, as soon as the difference of the later-measured signal integral has increased by more than the predetermined amount over the preceding signal integral, then a signal appears at the output of the threshold stage 18, with the result that, first, it is indicated at the output terminal 20 that irregular combustion is occurring and, second, the transfer switch 17 is switched over. The output signal of the comparator 14 now proceeds to the threshold stage 19, in which it is determined in analog fashion whether the measured signal integral has dropped by more than an amount specified in the threshold stage as compared with the immediately preceding signal integral, or not. So long as the signal continues to increase, or drops by less than the specified threshold as compared with the preceding signal integral, no signal appears at the output of the threshold stage 19 and thus at the output terminal 21. However, if the decrease in the signal exceeds the specified value, the output of the threshold stage 19 is activated; a signal appears at the output terminal 21, and the transfer switch 17 is switched back again. The overall result is the recognition that the irregular combustion has now ended.

Figure 2:
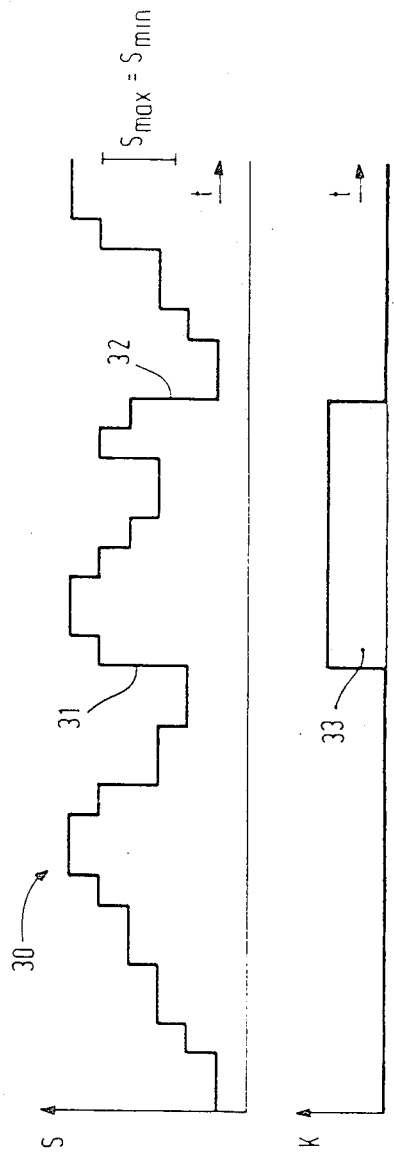

From the diagrams shown in FIG. 2, the method according to the invention can be explained in still greater detail. Plotted in FIG. 2 are, first, the signal integral S over the time t and, second, a recognition signal K for an irregular combustion, such as may be picked up by way of example at the output terminal 21, over the time t. The steps in the course over time of the signal integral represent the various measurement intervals, which exist in the form of measuring windows in each combustion cycle. Also shown in the diagram, on the right-hand edge, are the threshold values $S_{max}$ and $S_{min}$, which indicate the magnitude of the increase or decrease, respectively, in the signal integral, upon which the occurrence of regular or irregular combustion, respectively, is recognized. For the sake of simplicity, these thresholds are assumed in FIG. 2 to be of equal size. It will be appreciated, however, that thresholds of different sizes may also be selected; in particular, the value for the increase $S_{max}$ may be larger than the value for the decrease $S_{min}$.

In the course 30 of the signal integral S over the time t in FIG. 2, it is presumed that at first regular combustion is occurring. The course 30 increases slowly at first and then decreases once again, but without exceeding the threshold value $S_{max}$. Only at the increase 31 is the threshold $S_{max}$ exceeded, so that the recognition signal 33 is triggered. This recognition signal 33 now lasts until such time as the signal integral S has dropped, as described above, by more than the specified threshold value $S_{min}$. This is not the case in FIG. 2 until point 32, so that the recognition signal 33 disappears at that point.

The overall result attained by the method according to the invention is thus a reliable recognition of irregular combustion, both the onset and the end of the irregular combustion being indicated rapidly and precisely.

It will naturally be understood that the apparatus shown in FIG. 1 for performing the method according to the invention is shown only schematically and by way of example, and that the method according to the invention can also be performed with a multiplicity of other apparatuses, and in particular with a microcomputer. It is naturally also possible to use not merely a single sensor 10 at one cylinder of the engine, but instead a plurality of sensors at the various cylinders, the sensors being interrogated via a suitable multiplex circuit.

In measuring knocking of internal combustion engines, transducers which detect the engine oscillations are generally used. To this end, the transducers are designed for the known audio frequency of the knocking. The signal emitted by these transducers is compared with a reference signal, which forms the knocking threshold. In the method according to the invention, the reference signal corresponding to the knocking threshold is obtained by storing the intelligence signal appearing during one combustion cycle and evaluating it during the following combustion cycle as a reference signal. Rapid adaptation of the knocking threshold to existing background noise is thus possible. In order to attain more-precise measurement and to be able to estimate the knocking behavior of each cylinder separately, the combustion cycle is subdivided into several measurement cycles, the number of which corresponds to the number of cylinders. The intelligence signals associated with the individual cylinders are stored separately. Upon the next subsequent combustion cycle, the signals associated with the various measurement cycles—that is, the present intelligence signal at a given time and the immediately preceding intelligence signal, the latter now serving as the reference signal—are compared with one another. If knocking combustion is occurring, the intelligence signal should not be stored; instead, the reference signal used upon the occurrence of knocking combustion should continue to be used in the corresponding measurement cycle of the next combustion cycle also, and as needed in subsequent combustion cycles as well.

Figure 3:
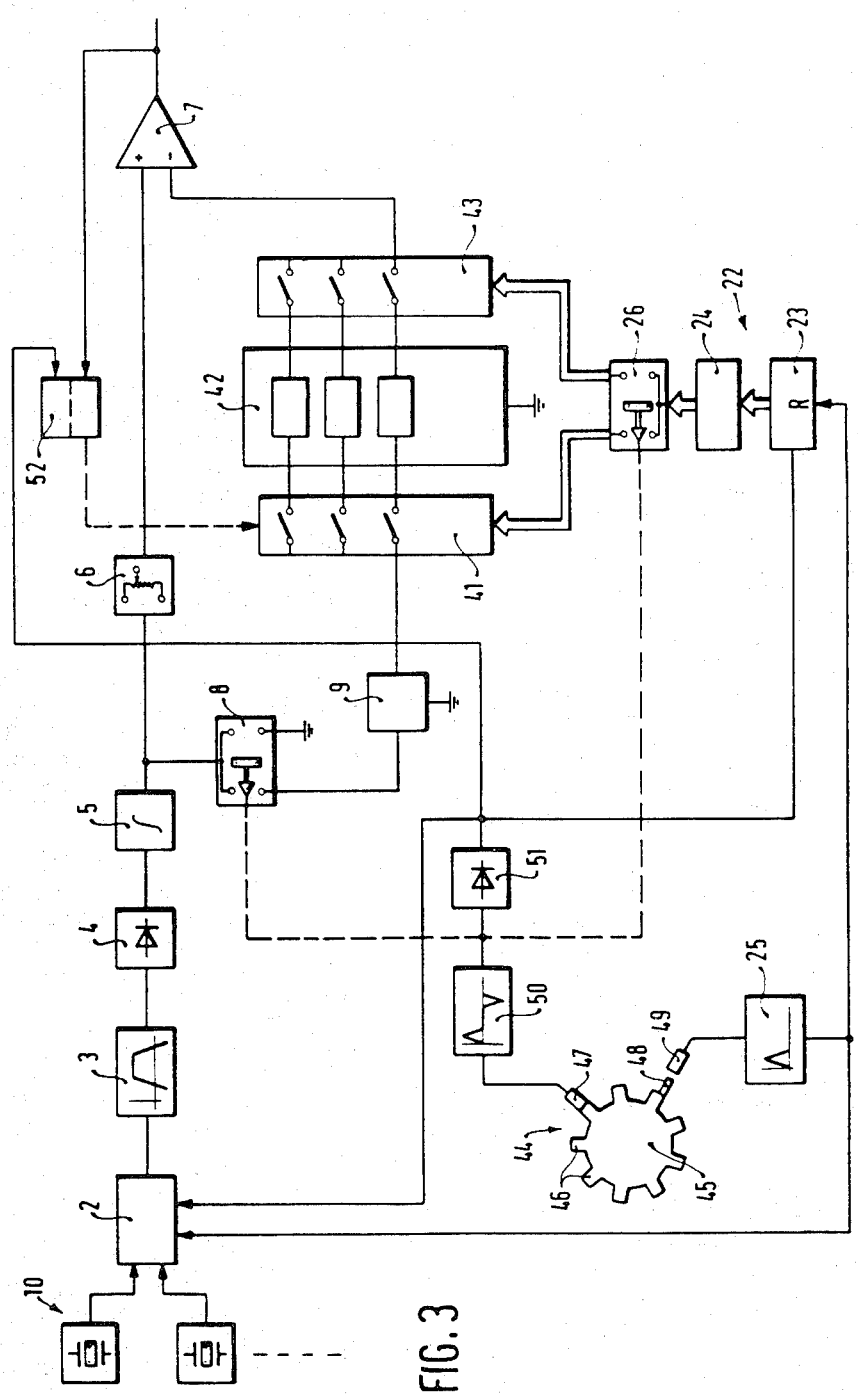

In the exemplary embodiment of the method according to the invention illustrated in FIG. 3, a plurality of knocking sensors 10 are connected with a demodulator circuit 4 via a multiplexer 2 and a filter 3, which may be embodied as a high-pass or band-pass filter. The output of the demodulator circuit 4 is connected to an integrating stage 5, which is carried in turn, via means for shifting the signal level 6 which may be embodied as voltage dividers, to the first input of a comparison circuit 7, which is preferably embodied as a comparator. The output of the integrating stage 5 is also connected via a switch 8 with a buffer memory 9. The output of the buffer memory 9 is connected with the second switching device 41, the outputs of which are carried to a memory device 42. The outputs of the memory device 42 are connected via the first switching device 43 with a further input of the comparison circuit 7. In order to fix the measurement cycles, a transducer apparatus 44 is used, which has a toothed disk 45, preferably connected with the crankshaft of an internal combustion engine, on which teeth 46 are disposed at the circumference. The teeth 46 are scanned by a first receiver 47, which operates optically or inductively or according to some other principle. A reference marker 48 is likewise disposed on the disk 45 and is scanned by a second receiver 49. The first receiver 47 is connected with a first pulse former stage 50, the output of which is connected via a rectifier 51 to a trigger stage 22. The trigger stage 22 is embodied as a counter 23 with a following decoder stage 24. The output of the rectifier 51 is carried to the counting input of the counter 23. The second receiver 49 is connected with a second pulse former stage 25, the output of which is carried to the reset input of the counter 23. The outputs of the decoder stage 24, via switching means 26, trigger the switch of the first and second switching devices 43 and 41. The switching means 26, like the switch 8, are actuated by the output of the first pulse former stage 50. The outputs of the rectifier 51 and of the second pulse former stage 25 are carried to the multiplexer 2. The output of the comparison circuit 7 is connected with the first input of a flip-flop 52, while the second input is connected to the output of the rectifier 51. The actuation of the switches of the second switching device 41 is effected not only via the switching means 26 but also with the aid of the output signal of the flip-flop 52.

The mode of operation of the apparatus shown in this figure is as follows:

Via the multiplexer 2 and in accordance with the cylinder recognition, which is effected with the aid of the transducer apparatus 44 and the pulse former stages 50 and 25, a particular knocking sensor 10 is connected to the filter 3. The undesired frequencies in the sensor signal are suppressed by the filtering taking place in the filter 3. The filtered sensor signal is rectified in the demodulator circuit 4, which may be embodied as a rectifier. The signal thus processed is integrated in the integrating stage 5 and carried, via the means for shifting the level 6, which are capable of reducing the value of the integral by a predetermined amount, to the noninverting input of the comparison circuit 7.

One combustion cycle is subdivided into several measurement cycles, specifically into a number of measurement cycles that corresponds to the number of cylinders. In order to specify the measurement cycles and to associate the individual cylinders with the measurement cycles, the transducer apparatus 44 and the pulse former stages 50 and 25 are used. Upon each passage past one tooth edge of the teeth 46 on the receiver 47, the receiver 47 emits an electrical signal. In the first pulse former stage 50, a positive pulse is formed when the leading edge of the teeth is involved and a negative pulse is formed in the case of the trailing edge of the teeth. By shifting the receiver 47 relative to the toothed disk 45, it is possible for the first pulse former stage 50 to emit a positive pulse whenever the piston in one cylinder reaches top dead center, for instance, during one combustion cycle. In this manner, a fixed relationship is established that is dependent on the crankshaft angle. A reference marker 48 is additionally disposed on the toothed disk 45 and cooperates with the second receiver 49. The reference marker 48 causes a positive pulse at the output of the second pulse former stage 25 whenever the crankshaft has attained some angle which can be established at a fixed value. For instance, this angle can be established such that the pulse former stage 25 emits a positive pulse whenever the piston, for instance the piston in cylinder one, attains top dead center. By means of the fixed sequence of ignition, it is then clear to which cylinder the next positive pulse at the output of the first pulse former stage 50 belongs. This discussion of the cylinder recognition is given purely by way of example; other known possibilities can also be used. The form of the pulses may also be different; for instance, the onset of the measurement cycle may be indicated by a positive edge and the end of the measurement cycle by a negative edge.

The positive pulse at the output of the first pulse former stage 50 marks the onset of one measurement cycle, while the negative pulse indicates the end of the measurement cycle. The switch 8 is actuated, given a positive pulse, in such a manner that a connection is established between the integrating stage 5 and the buffer memory 9. Given a negative pulse, this connection is broken, and the integrating stage has its output connected to ground.

If a piston passes top dead center during one combustion cycle, then the pulse former stage 50 emits a positive pulse. As a result, the formation of the integral in the integrating stage 5 is begun, since the switch 8 connects the output of the integrating stage 5 with the buffer memory 9 and the output is thus no longer connected to ground. The value of the integral is stored by the buffer memory 9, which may be embodied as a sample and hold circuit. The first and second switching devices 43, 41 are controlled by the trigger stage 22. To this end, the positive pulses at the output of the first pulse former stage 50 are carried to the counting input of the counter 23; the negative pulses are suppressed by the rectifier 51. The positive pulses at the output of the second pulse former stage 25 are fed to the reset input of the counter 23, so that the counter 23 is reset to zero by them. In the manner described above, the output signal of the counter 23 or of the decoder 24 is representative for the particular cylinder to which the measurement cycle just completed belongs. The positive pulse at the output of the first pulse former stage 50 also causes the switching means 26 to be switched in such a manner that the output of the decoder stage 24 is connected with the first switching device 43. The switching devices 41 and 43 and the memory device 42 each have a number of switches or memories, respectively, that corresponds to the number of cylinders. During the measurement cycle, the output of the decoder stage 24 directs the particular switch of the first switching device 43 that belongs to the associated measurement cycle or cylinder into the conductive state. The corresponding memory of the memory device 42 is then located, via the first switching device 43, at the inverting input of the comparison circuit 7; the output signal of the memory device 42 serves as the reference signal. If the comparison device 7 is embodied as a comparator, then its output is at zero whenever the intelligence signal is smaller than the reference signal and at 1 whenever the intelligence signal is larger than the reference signal. The status 1 at the output of the comparison circuit 7 means that knocking combustion is occurring, since the intelligence signal exceeds the knocking threshold corresponding to the reference signal. The negative pulse at the output of the first pulse former stage 50, which indicates the end of a measurement cycle, effects an interruption of the integral formation in the integrating stage 5, since the output of this stage is connected to ground via the switch 8. The switching means 26 are furthermore actuated by the negative pulse in such a manner that the second switching device 41 is now connected with the decoder stage 24. The switch of the second switching device 41 corresponding to the output of the decoder stage 24 is triggered, and the output of the buffer memory 9 is connected with the particular memory of the memory device 42 that corresponds to the measurement cycle just completed. This action causes the value of the intelligence signal for the just-completed measurement cycle, which is present in the buffer memory 9, to be stored in the memory of the memory device 42 that corresponds to that cylinder. Upon the next occurrence of combustion in this cylinder, this signal is available as a reference signal for comparison with the next intelligence signal.

If knocking combustion is occurring, then the intelligence signal then appearing must not be permitted to enter the memory device 42, because otherwise the measurements would become erroneous. A flip-flop 52 is therefore provided, the output of which predominantly controls the second switching device 41 in such a manner that the connection between the buffer memory 9 and the memory device 42 is interrupted if the recognition signal for knocking combustion appears at the output of the comparison circuit 7. The value stored in the buffer memory 9 cannot be transferred to the memory device 42 in that case, because the flip-flop 52 interrupts the connection until the beginning of the next measurement cycle. The corresponding memory of the memory device 42 retains its previously entered memory contents, which are then used as a reference signal for the following combustion cycle as well.

The switching devices, switching means and switches provided in this exemplary embodiment are preferably embodied as electronic elements.

If there is an abrupt increase in rpm, ignition angle or load, the background noise increases as well and thus the difference between the intelligence signal and the reference signal increases abruptly also. In order to avoid an erroneous recognition of knocking, the intelligence signal or the reference signal can be controlled in accordance with the rpm, the load or the ignition angle. This can be effected by means of amplifiers, which precede or follow the memories of the memory device 42, and the amplification factors of which depend on the indicated variables. On the other hand, the intelligence signal can be adapted by means of a variation of the means for shifting the signal level 6, the variation being dependent on rpm, load or ignition angle.

I claim:

1. A method for recognizing the knocking of an internal combustion engine,
    in which a sensor signal is integrated within an interval of the combustion cycle to produce an intelligence signal,
    at least one intelligence signal associated with the knocking process is compared with at least one reference signal corresponding to the background noise and
    a recognition signal is emitted whenever the intelligence signal exceeds the reference signal in a pre-specified manner,
    wherein, in accordance with the invention,
    the intelligence signal occurring during one combustion cycle is stored and,
    during the next combustion cycle, this stored intelligence signal is used as a reference signal and is compared with the intelligence signal appearing at that time,
    and wherein,
    in the event of the emission of the recognition signal for knocking combustion during a combustion cycle,
    the reference signal used during this combustion cycle is also used during the following combustion cycle.

2. A method as defined by claim 1, characterized in that a separate intelligence signal or reference signal is associated with each cylinder.

3. A method as defined by claim 1, characterized in that the comparison between a particular intelligence signal and reference signal is performed within a measurement cycle that can be established at a fixed value, and one measurement cycle is associated with each cylinder.

4. An apparatus having at least one knocking sensor emitting a signal, one demodulator circuit and one comparison circuit having first and second inputs for comparing the intelligence signal and the reference signal, characterized in that a buffer memory (9), a memory device (42), a first switching device (43) and a second switching device (41) are provided, that the demodulator circuit (4) is connected with both the buffer memory (9) and the first input of the comparison circuit (7), that the memory device (42) can be connected via the first switching device (43) to the second input of the comparison circuit (7) and that the buffer memory (9) can be connected via the second switching device (41) with the memory device (42).

5. An apparatus as defined by claim 4, characterized in that for the fixing of the measurement cycles, a transducer apparatus (44) connected with the crankshaft is provided, the transducer apparatus being connected with a first pulse former stage (50), which emits different signals at the onset and at the end of the measurement cycle.

6. An apparatus as defined by claim 4, characterized in that the switching devices (41, 43) are controlled in such a manner that at the onset of the measurement cycle the first switching device (43) changes into the conductive state and the second switching device (41) changes into the non-conductive state, and after the termination of the measurement cycle the first switching device (43) changes into the non-conductive state and the second switching device (41) changes into the conductive state.

7. An apparatus as defined by claim 4, characterized in that the memory device (42) has a number of memories corresponding to the number of cylinders of the engine and that the first and second switching devices (43, 41) have a number of switches corresponding to the number of cylinders.

8. An apparatus as defined by claim 4, characterized in that in addition, a plurality of knocking sensors (10), preferably corresponding in number to the number of cylinders, is connected via a multiplexer (2) with the demodulator circuit (4).

9. An apparatus as defined by claim 5, characterized in that a flip-flop (52) is provided, at the inputs of which are located the output signals of the comparison circuit (7) and the transducer apparatus (44) and the output signal of which controls the second switching device (41) in such a manner that in the presence of the recognition signal for knocking combustion, the second switching device (41) is kept in the non-conductive state until the onset of the next measurement cycle.

10. An apparatus as defined by claim 5, characterized in that a trigger stage (22) is provided, which can be connected on the one hand to the transducer apparatus (44) and on the other, via switching means (26), with the first and second switching devices (43, 41), which correspond with the cylinder associated with the particular measurement cycle.

11. An apparatus as defined by claim 4 characterized in that an integrating stage (5) is disposed between the demodulator circuit (4) and the comparison circuit (7) and buffer memory (9).

12. An apparatus as defined by claim 11, characterized in that between the integrating stage (5) and the buffer memory (9), a switch (8) is provided, which, after the termination of the particular measurement cycle, breaks the connection between the integrating stage (5) and the buffer memory (9), and simultaneously connects the output of the integrating stage (5) to ground.

* * * * *